Oct. 5, 1965   W. P. VAN DEN BLINK ETAL   3,210,517
ARC-WELDING METHOD FOR CONNECTING AN END FACE OF A STUD
BOLT OR THE LIKE TO A WORK PIECE AND ANNULAR
SLAG-BUILDING BODIES FOR USE IN SAID METHOD
Filed March 1, 1963

INVENTOR
WILLEM P. VAN DEN BLINK
EELKE H. ETTEMA
BY
AGENT

United States Patent Office 3,210,517
Patented Oct. 5, 1965

3,210,517
ARC-WELDING METHOD FOR CONNECTING AN END FACE OF A STUD BOLT OR THE LIKE TO A WORK PIECE AND ANNULAR SLAG-BUILDING BODIES FOR USE IN SAID METHOD
Willem Pieter van den Blink and Eelke Herman Ettema, Utrecht, Netherlands, assignors to North American Philips Company, Inc., New York, N.Y., a corporation of Delaware
Filed Mar. 1, 1963, Ser. No. 261,986
Claims priority, application Netherlands, Mar. 14, 1962, 275,966
10 Claims. (Cl. 219—99)

This invention relates to an arc-welding method for fastening an end face of a stud, a bolt or the like to a work piece, in which an annular, electrically conductive, slag-building body having semi-conductor properties is arranged between the end of the stud or the like and the work piece, and an electric arc is struck between the stud and the work piece, which arc is initiated via the annular body, whilst after some time, when part of this body has softened or melted and a molten pool is formed in the work piece, the stud is moved towards the work piece. Such a method will be briefly termed hereinafter the stud-welding process. The invention furthermore relates to an annular, slag-building body used for carrying out said method. This body will be termed hereinafter the welding cartridge.

There are known electrically conductive, annular, slag-building bodies, the electric conductivity of which corresponds with that of semi-conductors. This implies inter alia that the electrical resistance is the lower the higher is the temperature. With the stud-welding process carried out by means of such bodies this involves that during the passage of the current the body is softened not uniformly but more or less unilaterally, since at that place of the welding cartridge where owing to random conditions the electric contact with the stud or with the plate to which the stud is to be fastened is more favourable than at other places, the current density is at a maximum as soon as an electric voltage is applied between the stud and the plate. Thus the semi-conductive material is softened locally more drastically than the surrounding parts. This involves that the resistance at the place concerned becomes lower than that of the surrounding parts, which brings about a greater concentration of current. This avalanche effect of the current may result in that the welding cartridge is locally softened when the weld is established. Under most conditions this is not disadvantageous since by far in most cases the softened material can contribute to an adequate extent in substantially the same manner to the formation of the weld at the molten slag in a welding process using coated electrodes.

Difficulties arise, however, in welding studs having a diameter of more than about 10 mms. to a vertical or at least inclined surface, since, if the softened part of the welding cartridge is located substantially on the lower side a comparatively great quantity of molten metal may, under the action of the force of gravity, break up the softened part of the welding cartridge and flow partly away. In this case the weld does not grow completely around the circumference of the stud.

The invention is based on the recognition of the fact that this difficulty can be avoided by concentrating the current on one side of the welding cartridge in stud-welding.

In accordance with the invention, during the initiation of the welding process the stud is disposed at an angle or eccentrically to the body or the stud and/or the body and/or the work piece are composed and/or formed and/or machined so that during the beginning of the welding process the arc does not burn on one side of the annular body.

In the method embodying the invention in which during the beginning of the welding process the stud is disposed at an angle or eccentrically on the cartridge so that an electric contact is established only on one side, for example the upper side when the stud has to be welded to a vertical or sloping plate, the stud can be moved into the correct position after the arc is struck.

This method involves the disadvantage that it introduces a complication of the process, which renders it more difficult to fasten the stud at a predetermined place.

In a further embodiment of the new method the stud can be provided at the edge with an extension and be disposed so that the extension is located on the upper side and serves for establishing the electric contact.

This method has the disadvantage that it requires an additional processing of the studs.

The invention may furthermore be realized by providing such a composition or shape of the welding cartridges that even when using cylindrical studs without particular shape, disposed in line with and concentrically to the welding cartridge, the passing current is concentrated on one side of the welding cartridge.

In respect of the composition the desired result may be obtained either by a local increase in electrical resistance (for example by means of an insulating layer) or by a local reduction of the electrical resistance (for example, by locally providing a conductive layer or wire).

With a welding cartridge of known type, in which the annular, slag-building body is surrounded by a ring of cardboard or similar material, the insulating layer may be obtained in a simple manner by providing said ring with a tag which extends beyond the face of the ring engaging the work piece.

To the same end the plate may be provided with a local insulation or there may be provided a local improvement in conductivity for example by removing partly the oxide layer.

These methods involve an additional process in the manufacture of the welding cartridges or a special treatment of the plate.

The invention is therefore preferably carried out by choosing a special shape of the welding cartridges. As a rule these welding cartridges are formed by compressing powdery material and within given limits the shape thereof can be adapted to the requirements of the process without affecting the costs.

In one embodiment of the invention the slag-building body is adapted to establish a contact at three places with a cylindrical stud to be disposed on the body and at two places with the work piece to which the stud is to be welded.

The drawing shows by way of example two embodiments of welding cartridges according to the invention.

Figures 1, 2, 3:
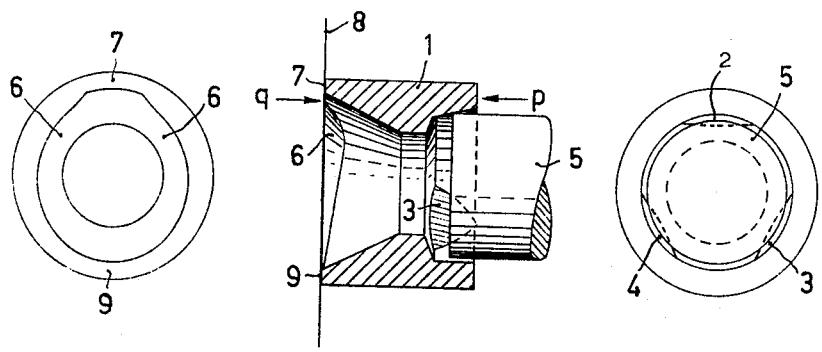
FIG. 1 is a longitudinal sectional view of a cartridge co-operating with a stud and a work piece.
FIG. 2 is an elevation of the cartridge shown in FIG. 1, viewed in the direction of the arrow *p*.
FIG. 3 is an elevation of the cartridge shown in FIG. 1, viewed in the direction of the arrow *q*.

The welding cartridge 1 comprises an annular body of a mass of semi-conductive material. On the inner side of the ring there are provided three faces 2, 3 and 4, which serve for centering and holding a stud 5, whilst they establish at the same time the electric contact between the stud and the cartridge.

Without special precautions the probability of an ignition of the arc via the faces 2, 3 and 4 is a priori the same.

However, by providing a special shape of the side of the welding cartridge 1 resting on the plate 8 for welding, which shape is obtained by providing recesses 6, the electrical resistance between the contact area of the stud 5 and the face 2 and the contact area 7 of the cartridge and the plate 8 is smaller than that between the contact area of the stud 5 and the face 3 or 4 and the contact area 9 of the cartridge and the plate 8. When applying the electric voltage between the stud 5 and the plate 8, the current is concentrated mainly on that side of the welding cartridge which lies near the area 7.

If care is taken that, when welding on a sloping or vertical surface, the face 7 is located on the upper side, the local softening of the welding cartridge will be restricted mainly to the upper side, whilst unwanted loss of molten metal will not occur.

Various other embodiments may be developed, such that the stud 5 is in contact not with three but with two diametrically opposite faces, whilst on the side of the plate 8 the welding cartridge 1 touches the plate 8 at three or more places, so that the resistance between one of the two faces on the side of the stud and the plate is lower than that between the other face and the plate. It is advisable, however, to choose such an embodiment that after the welding cartridge is arranged on the stud, the welder is capable of checking the correct position of the welding cartridge on the outer side.

Figures 4, 5:
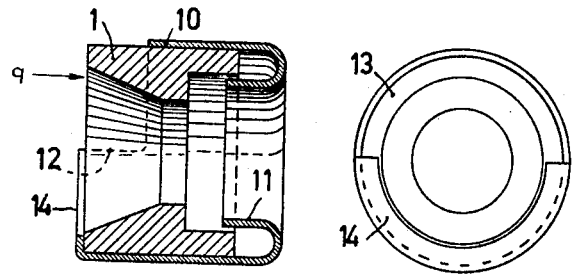
FIG. 4 is a longitudinal sectional view of a second embodiment.
FIG. 5 is an elevation taken in the direction of the arrow *q* in FIG. 4.

FIG. 4 shows one embodiment of an annular body 1 of slag-building material, held in a ring 10 of cardboard or similar, rigid insulating material. The ring 10 provides a clamping connection between the body 1 and a stud 5, introduced therein by means of the curved edge 11 of the ring 10. In accordance with the invention the ring 10 is provided with a projecting tag 12, which extends over the face 13 of the ring 1 by a portion 14. At the beginning of the welding process the arc does not burn at said place.

From the foregoing it will be obvious that the invention may be carried out not only on flat plates, but also on pipes, cylinders and the like.

When welding on a curved surface the shape of the welding cartridge may, if desired, be adapted to that of the surface.

It will furthermore be obvious that the welding cartridges in the embodiments described may also be used for welding on horizontal plates and the like. Under given conditions it may be advantageous also in this case to cause the ignition to be performed on a given side, in order to minimize the risk of loss of material on the other side. This may be the case for example in welding on edges of a plate. In this case an excessively extension of the molten pool would also give rise to loss of material.

We claim:

1. A method for electric arc-welding an object to a work piece in which the interface between the object and the work piece is inclined with respect to a plane normal to the earth's gravitational field comprising the steps of, placing a slag building cartridge having semi-conductor properties in the interface in at least partial contact with both the work piece and the object, whereby when an arc is struck between the work piece and the object through the cartridge, the arc burns over only that portion of the cartridge extending between the work piece and the object, and positioning said portion with respect to the earth's gravitational field to prevent the escape of molten metal from the interface under the influence of the earth's gravitational field.

2. A method for electric arc-welding an object to a work piece in which the interface between the object and the work piece is inclined with respect to a plane normal to the earth's gravitational field comprising the steps of, placing a slag building cartridge having semi-conductor properties in the interface in partial contact with the object and in at least partial contact with the work piece whereby when an arc is struck between the work piece and the object the arc burns over only that portion of said slag building cartridge in the proximity of the partial contact area with the object, and positioning said partial contact between the object and the cartridge with respect to the earth's gravitational field to prevent the escape of molten metal from the interface under the influence of the earth's gravitational field when the arc is struck.

3. A method for electric arc-welding an object to a work piece in which the interface between the object and the work piece is inclined with respect to a plane normal to the earth's gravitational field comprising the steps of, placing a slag building cartridge having semi-conductor properties in the interface in partial contact with the work piece and in at least partial contact with the object whereby when an arc is struck between the work piece and the object the arc burns over only that portion of said slag building cartridge in the proximity of the partial contact area with the work piece, and positioning said partial contact between the work piece and the cartridge with respect to the earth's gravitational field to prevent the escape of molten metal from the interface under the influence of the earth's gravitational field when the arc is struck.

4. A slag building cartridge for use in welding an object to a work piece in which the interface between the object and the work piece may be inclined with respect to a plane normal to the earth's gravitational field comprising, an apertured body, said body having a non-uniform wall thickness in the contact area with the work piece to provide different electrical resistivity between the object and the work piece which is a function of the wall thickness in the contact area with the work piece whereby when the cartridge is positioned between an object and a work piece and an electric arc is struck burning occurs in the area of minimum wall thickness first.

5. A slag building cartridge as set forth in claim 4 in which the apertured body is constructed of material having semi-conductor properties.

6. A slag building cartridge for use in welding an object to a work piece in which the interface between the object and the work piece may be inclined with respect to a plane normal to the earth's gravitational field comprising, an apertured body, a ring of insulating material surrounding a portion of said body, and a tag of insulating material projecting from said ring and extending over a portion of cartridge area which engages the work piece.

7. A slag building cartridge as set forth in claim 6 in which the ring and tag are unitary and formed from the same piece of material.

8. A slag building cartridge as set forth in claim 7 in which the unitary piece of material constituting the ring and tag is cardboard and the apertured body is constructed of material having semiconductor properties.

9. A slag building cartridge as set forth in claim 6 in which the apertured body is constructed of material having semi-conductor properties.

10. A slag building cartridge for use in welding an object to a work piece in which the interface between the object and the work piece may be inclined with respect to a plane normal to the earth's gravitational field comprising, an apertured body constructed of material having semi-conductor properties and having its contact area with the work piece shaped to provide two areas of contact of lowered electrical resistance and its contact area with the object shaped to provide three areas of contact to provide a preselected limited area path of low electrical resistance between the object and the work piece.

References Cited by the Examiner
UNITED STATES PATENTS 2,829,234 4/58 Blink _____ 219—99
2,829,235 4/58 Blink _____ 219—99
3,079,488 2/63 Clevers _____ 219—99

RICHARD M. WOOD, *Primary Examiner.*